(12) United States Patent
Ballard

(10) Patent No.: US 9,317,467 B2
(45) Date of Patent: Apr. 19, 2016

(54) SESSION KEY ASSOCIATED WITH COMMUNICATION PATH

(71) Applicant: HEWLETT-PACKARD DEVELOPMENT COMPANY, L.P., Houston, TX (US)

(72) Inventor: Curtis C. Ballard, Eaton, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 659 days.

(21) Appl. No.: 13/628,886

(22) Filed: Sep. 27, 2012

(65) Prior Publication Data

US 2014/0089556 A1 Mar. 27, 2014

(51) Int. Cl.
*G06F 13/42* (2006.01)

(52) U.S. Cl.
CPC ...................................... *G06F 13/42* (2013.01)

(58) Field of Classification Search
CPC ...................................................... G06F 13/42
See application file for complete search history.

(56) References Cited

U.S. PATENT DOCUMENTS

| | | | |
|---|---|---|---|
| 5,293,576 A | 3/1994 | Mihm et al. | |
| 5,712,971 A | 1/1998 | Stanfill et al. | |
| 5,768,162 A | 6/1998 | Rupp et al. | |
| 5,917,840 A | 6/1999 | Cheney et al. | |
| 6,185,203 B1 | 2/2001 | Berman | |
| 6,185,638 B1 * | 2/2001 | Beardsley et al. | 710/36 |
| 6,431,315 B1 | 8/2002 | Lewis | |
| 6,591,164 B1 | 7/2003 | Plutt et al. | |
| 6,725,394 B1 | 4/2004 | Bolt | |
| 6,816,917 B2 | 11/2004 | Dicorpo et al. | |
| 6,938,091 B2 | 8/2005 | Das Sharma | |
| 6,952,792 B2 | 10/2005 | Emberty et al. | |
| 7,024,591 B2 | 4/2006 | Moody et al. | |
| 7,134,040 B2 | 11/2006 | Ayres | |
| 7,477,606 B2 | 1/2009 | Mahasoom et al. | |
| 7,644,318 B2 | 1/2010 | Dicorpo et al. | |
| 7,707,456 B2 | 4/2010 | Tanaka et al. | |
| 7,992,048 B2 | 8/2011 | Komatsu et al. | |
| 8,443,119 B1 * | 5/2013 | Limaye et al. | 710/31 |
| 9,135,124 B2 | 9/2015 | Ballard | |
| 2001/0019536 A1 | 9/2001 | Suzuki | |
| 2001/0034791 A1 | 10/2001 | Clubb et al. | |
| 2002/0065962 A1 | 5/2002 | Bakke et al. | |
| 2002/0116564 A1 | 8/2002 | Paul et al. | |
| 2002/0129312 A1 | 9/2002 | Sipola | |
| 2003/0172181 A1 | 9/2003 | Sharma | |
| 2003/0187987 A1 | 10/2003 | Messick et al. | |
| 2003/0233154 A1 | 12/2003 | Kobziar | |
| 2004/0107320 A1 * | 6/2004 | Gallo et al. | 711/147 |
| 2005/0081080 A1 | 4/2005 | Bender et al. | |
| 2005/0138248 A1 | 6/2005 | Goodman et al. | |
| 2005/0188239 A1 * | 8/2005 | Golasky et al. | 714/2 |
| 2006/0015770 A1 * | 1/2006 | Dicorpo et al. | 714/5 |
| 2007/0121638 A1 | 5/2007 | Szczebak et al. | |
| 2007/0242689 A1 | 10/2007 | Zavadsky et al. | |

(Continued)

*Primary Examiner* — Nimesh G Patel

(74) *Attorney, Agent, or Firm* — International IP Law Group, PLLC

(57) ABSTRACT

Techniques for associating a session key with a communication path are provided. A host may provide a session key to a library controller over a first communications path. The library controller may associate the communications path with the session key. In one aspect, commands received over the first communications path are associated with the session key. In another aspect, the session key may be associated with a second communications path when the communications path is to be changed.

19 Claims, 6 Drawing Sheets

(56) References Cited

U.S. PATENT DOCUMENTS

| | | |
|---|---|---|
| 2008/0091972 A1 | 4/2008 | Tanaka et al. |
| 2010/0083061 A1 | 4/2010 | Coronado et al. |
| 2011/0179188 A1* | 7/2011 | Nakagawa et al. ........... 709/240 |
| 2013/0151888 A1* | 6/2013 | Bhattiprolu et al. ........... 714/6.3 |

* cited by examiner

SESSION KEY ASSOCIATED WITH COMMUNICATION PATH

BACKGROUND

Many computing systems utilize media libraries for persistent, long term storage. One example of a media library is a magnetic tape library, in which magnetic tape media is used to store digital data. A tape library typically includes one or more tape drives. The tape drives contain the necessary components to read and write data to/from a magnetic tape. The tape library may also include an area for tape storage, to store tapes that are currently not inserted into a tape drive. The tape library may also include a media changer (e.g. robot) that is able to move tapes between the tape drives and the tape storage.

A host computer may be connected to the tape library via a network, such as a Serial Attached Small Computer Systems Interface (SAS) network. The tape library may include a media library controller that is connected to the network as well as the media changer. When a host wishes to write data to a tape that is nor currently inserted into a tape drive, the host may send a command to the media library controller to move the desired tape into one of the drives. The host may also be able to query the media library through the controller to retrieve status information, such as an inventory of all tapes currently housed in the media library.

DETAILED DESCRIPTION

Figure 1:
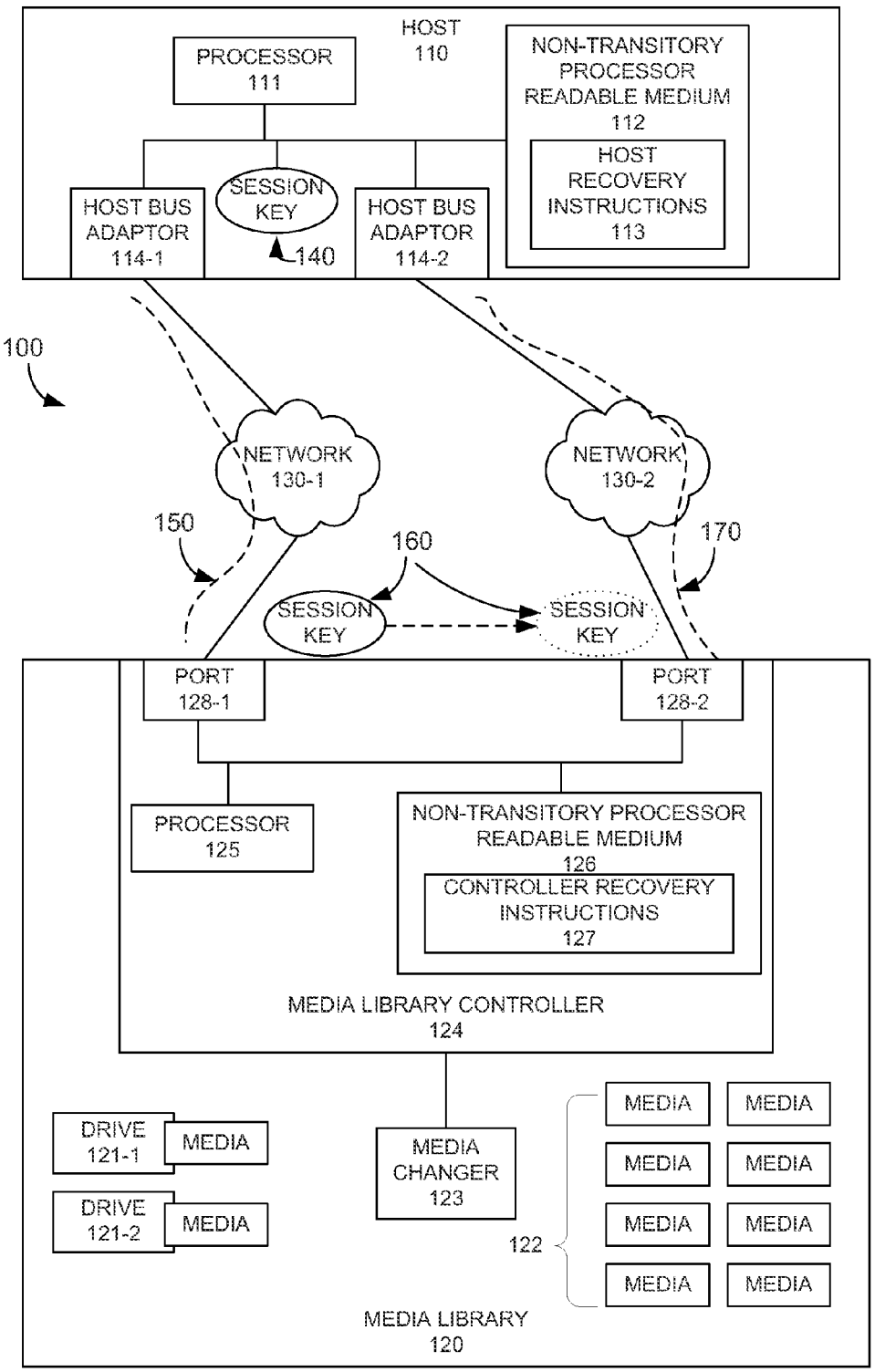
FIG. 1 is an example of system in accordance with the techniques described herein.

A media changer in a media library may be connected to a media library controller. The media library controller may receive commands from a plurality of host computers which instruct the media controller to move the media or obtain status information about the media library. The media library controller may respond to the host that sent a command with the results of the command. The media library controller may be connected to a network via a plurality of ports, with each port representing a target. Likewise, each host may be connected to the network via one or more host bus adaptors (HBA), with each host bus adaptor representing an initiator. The route from a given initiator to a given target may be referred to as a communications path. The communications path may also be referred to as a nexus. In operation, a media library controller does not keep track of the particular host that sent a command, but rather notes the nexus on which the command was received. When the command completes, the response is sent over the same nexus that received the command. In a SAS network it is not possible to determine which host sent a command using the information available on the nexus.

A problem may arise when it becomes necessary to change the nexus, or communications path, used by a particular host. For example, a host may have two HBAs. Each HBA represents an initiator. If commands to a media library controller are being sent over one of the HBAs and that HBA should fail, the host may switch to the second HBA. However, there may have been commands that were sent over the first HBA for which responses have not yet been received. As mentioned above, the media library controller may respond to commands over the same nexus on which the command was received. However, if the nexus is changed, the mechanism no longer works.

Further exacerbating the problem is the fact that some commands may cause persistent changes in the media library. An example of a command that does not cause a persistent change would be a command to query the current inventory of tapes in a tape storage library. If such a command were received, but the response were lost due to a nexus change, the command could simply be repeated. The reason for this is that absent manual intervention, the inventory of tapes contained in the storage library would not change.

However, other commands may cause persistent changes in the media library. For example, a command to move the tape in storage slot X to tape drive Y causes a physical change in the location of a tape. If such a command were received, and then the nexus was changed, the response would not be received by the host that sent the command. The host is then unaware of the position of the tape. For example, if the nexus change was caused by a path failure, then there are four possibilities. First, the command was never received by the media library controller. Second, the command was received by the media library controller and is in queue awaiting processing. Third, the command was received by the media library controller and is currently being processed. Fourth, the command was received and completed, but the response was lost due to the path change.

As should be clear, in the case of commands that cause persistent changes, the host cannot simply resend the command. For example, if the command was to move the tape from storage slot X to tape drive Y and the command completed, a resend of the command would cause the media library controller to attempt to move a tape from now empty storage slot X. Rather than simply resend the command, the host must first determine the current state of the media library and take corrective action as appropriate. The process of taking corrective action may be referred to as recovering the command.

The techniques described herein overcome the problems described above. Each host, upon initialization generates a unique session key that is associated with the host itself and not any particular initiator on the host. When first communicating with a media library controller, the host sends this session key to the media library controller over the current nexus. The media library controller associates the session key with the particular nexus that received the command. It should be noted that the session key is associated with the nexus, not the particular host. If it becomes necessary for the host to change the nexus, the host sends a change nexus command over the new nexus that includes the session key. The media library controller then disassociates the session key from the first nexus and re-associates the session key with the new nexus. The session key may also be used by the host and the media library controller to recover commands that were sent prior to the nexus change, as will be described below and in conjunction with the appended figures.

FIG. 1 is an example of system in accordance with the techniques described herein. System 100 may include a host 110, a media library 120, and networks 130-1,2 that connect the host and the media library. In general, the host communicates with the media library over the networks to read data from or write data to the media library. The host may also query the media library for status information.

Host 110 may be any type of computing device, such as a personal computer or desktop computer. The host may also be a more powerful device such as a server computer. The host could also be other types of devices, such as tablets Or a Smartphone. What should be understood is that the host may be any type of computing device that may require access to the media library. In addition, although only one host 110 is shown, it should be understood that there be many hosts. A single host was shown for purposes of ease of description and not by way of limitation.

The host 110 may include a processor 111. The processor may be any suitable type of processor that is able to read and execute processor readable instructions. Coupled to the processor may be a non-transitory processor readable medium 112. Contained on the processor readable medium may be a set of host recovery instructions 113, which are instructions that when executed by the processor cause the processor to implement the functionality that is described herein. The functionality implemented is described in further detail below.

The host may also include one or more host bus adaptors 114-1,2 coupled to the processor. The host bus adaptors may allow the host to communicate with the media library controller through a network. In some implementations, an application (not shown) that is stored on the non-transitory medium may run on the host and allows the host to interface with the host bus adaptors. In some cases, this interface is provided through the use of device drivers (not shown). The functionality described herein may be implemented in the application, the device driver, the host bus adaptor, or any combination thereof. Thus, for purposes of this description, functionality provided by the host is described in terms of the host alone, although it should be understood that the actual functionality may be implemented by any combination of the aforementioned elements.

The media library 120 may be a device that provides persistent storage for data on what is typically removable media. For example, one form of media may be tapes, on which data is written to a magnetically coated strip of material contained in a housing. Media libraries may also use other forms of media, such as optical disks. The remainder of the description is based on a tape media library, however it should be understood that the techniques described are not limited to tape storage.

The media library may contain a plurality of drives 121-1, 2. The drives may contain the necessary hardware and software components to read and write data to and from the removable media. In the case of a media library utilizing tapes, the drives may be tape drives. In the case of optical disks, the drives may be optical drives. For purposes of description, only two drives are shown. However, it should be understood that there may be any number of drives.

The media library may also include an area for storage of media 122. When a particular piece of media is not currently inserted into one of the drives, the media may be stored in the media storage area. For example, in the case of a tape library, the media storage area may be a plurality of slots, in which tapes may be stored. In order for data to be read from or written to a tape that is currently in the media storage area, the tape must first be moved to one of the drives.

Media may be moved from the media storage area to one of the drives by a media changer 123. The media changer is typically a robot that is able to physically move media from the media storage area and move the media into one of the drives. Likewise, the media changer is also able to remove media from one of the drives and return the media to the media storage area.

Coupled to the media changer may be a media library controller 124. The media changer may physically move the media from one location to another, but the instructions for the actual movements may be provided by the media library controller. The media library controller may include a processor 125. Just as above, the processor may be of any suitable type that is able to execute processor readable instructions in order to cause the processor to implement the functionality described herein. Coupled to the processor may be a non-transitory processor readable medium 126 containing there on a set of controller recovery instructions 127, which when executed by the processor cause the processor to implement the functionality described herein.

The media library controller may include ports 128-1,2 which connect the media library controller to the network. The media library controller may receive commands through the ports. Although only two ports are shown, it should be understood that there may be any number of ports. Furthermore, although the media library controller is shown as an isolated component of the media library, in some implementations, the controller may be integrated with other components. For example, in some implementations the media library controller may be integrated with the drives 121. Thus, one of the drives is selected as the media library controller and all commands to the media changer are routed through the selected drive. The techniques described herein are not limited to any particular implementation of the media library controller.

The host 110 and the media library 120 may be connected by networks 130-1,2. Although two separate networks are shown, this is for purposes of describing that there may be more than one path between the host and the media library. The two networks shown may actually be a single physical network or could in fact be two completely isolated networks. For purposes of this description, the networks may be a Serial Attached Small Computer Systems Interface (SAS) network. However, any other type of network and protocol could also be used. Some examples of other types of networks could include Fiber Channel (FC) or Ethernet. Regardless of the particular type of network, what should be understood is that the network may provide one or more communications paths between the host and the media library.

In operation, when a host starts up, it may generate a session key 140. The session key is unique to a host, meaning that no two hosts will share the same session key. Any number of mechanisms may be used to ensure that the session key generated by each host is unique. The session key is associated with the host and not with any individual initiator within the host. Thus, regardless of the number of host bus adaptors in the host, there will be one session key.

As part of the initialization process, the host may send a registration command to the media library controller that includes the session key. The host may send the registration command over a first communications path. For example, the first communications path 150 may be the path, or nexus, formed from initiator 114-1, through network 130-1, to port 128-1. Upon receipt of the registration command, the media library controller may associate the nexus 150 with the session key 160. Once the association is complete, commands received over nexus 150 will be associated with the session key. It should be noted that the media library controller is not aware of the particular host that generated the session key, rather it just knows that commands received over nexus 150 are to be associated with the previously registered session key 160.

Normal operation of the system may commence. The host may send commands to the media library controller. For example, commands may be sent to move media from one location to another. In addition, commands may be sent to query the status of the media library, such as requesting an inventory of all media currently residing within the media library. Each command that is received is associated with the session key that is associated with the nexus on which the command was received. Upon completion of a command, the media library controller may send a response to the command indicating if the command completed successfully and any results of the command. The response to the command may be sent over the nexus associated with the session key that is associated with the command. In the description above, the responses may be sent over nexus 150.

At some point, it may become necessary to change the nexus over which commands are sent from the host to the media library controller. For example, host bus adaptor 114-1 may fail. Network 130-1 may fail. Port 128-1 may fail. In cases where the media library controller is integrated with one of the drives, the drive may fail and a new drive may be chosen to provide the media library controller functionality. In some cases, the entire media library controller may fail, but there is a backup media library controller which can provide the media library controller functionality. Regardless of the particular reason for the nexus change, what should be understood is that nexus 150 is no longer available.

The host may send a nexus change command to the media library controller over a second communications path. For example, the second communications path may be the nexus 170 formed by host bus adaptor 114-2, network 130-2, and port 128-2. Included in the nexus change command may be the session key 140. Upon receipt of the nexus change command the media library controller may disassociate the session key 160 from nexus 150 and re-associate the session key 160 with nexus 170.

In an example of an alternative implementation, during initialization the host may send a registration command that includes the session key to the media library controller over several different paths. The media library controller may build a table of paths that are associated with the session key. In such an implementation, it is not necessary to include the session key with the nexus change command. When the nexus change command is received, the session key may be retrieved from the table. For the remainder of this description, a communications path associated with a session key refers to the path that is currently in use for communications with a specific host. Thus, even if the session key has been registered with more than one path, the session key being associated with the path means the path that is to be used for communication with the host.

At this point, the host may have one or more commands that are outstanding. An outstanding command is a command which has been sent by the host to the media library controller, but for which no response has yet been received. There are several possibilities for what may have happened to the outstanding command. First, the communications path may have failed prior to the command being received by the media library controller. Second, the command may have been received by the media library controller, but is waiting in queue to be processed. Third, the command may be currently being processed Finally, the command may have already completed, but the response was not received by the host due to the failure of the communications path. Depending on the type of command and the completion state of the command, different recovery steps may be needed.

For each outstanding command, the host may send a second command to notify the media library controller that, from the hosts perspective, no response has been received for the command. The second command may also include an indication of if the host intends to resend the outstanding command. The second command may also include an indication of if recovery is needed. As mentioned above, some commands cause persistent changes in the media library, such as physically moving media from one location to another. For such commands, it is not possible to simply resend the command, because the position of the media is dependent on the completion state of the command. Such commands require recovery, which is described in further detail below.

In response to the second command, the media library controller may determine the completion state of the outstanding command. As mentioned above, the session key is now associated with the second communications path. Thus, when the second command is received, the second command is associated with the session key of the host. The media library controller can then determine which previously received commands were associated with the session key to determine if the commands were not received, in queue, in progress, or complete. Furthermore, the second command informs the media library controller of the intention of the host to recover the command. In some example implementations, the nexus change command and the second command may be combined into a single command. Thus, a single command both changes the nexus that will be used for a particular session as well as notifies the media library controller that the command will be resent.

In the case of an outstanding command that does not require recovery, the host may simply resend the command. If the command had never been received by the media library controller or had been received and completed, but the response was not received by the host, the command can simply be executed again. Because commands that do not require recovery cause no persistent changes in the media library, the results of multiple executions of the same command will be the same. If the command is in progress or is in queue waiting to be completed, the resend of the command can be associated with the in progress or in queue command based on the session key, and a single response may be sent.

In the case of a command that does require recovery, the host resends the command. Because of the second command received above, the media library controller is aware that the command is being resent. When the resend of the command is received, one of several possibilities occurs. If, based on the session ID, the original command has already completed, the media library controller responds to the resend of the command with a successful completion response. If the command is in progress, the media library controller waits until the command is complete, and sends a single response over the new nexus that is now associated with the session key indicating successful completion. If the command is in queue waiting for completion, in some example implementations the media library controller associates the resend of the command with the originally received command. In other example implementations, the command currently in the queue may be removed from the queue and the newly received command added to the queue. Once the command completes, a single successful completion response is sent. Finally, if the first command was never received by the media library controller, the resend of the first command is simply placed in queue for execution just as if it were a newly received command. Once the command completes, the response may be sent to the host.

Figure 2:
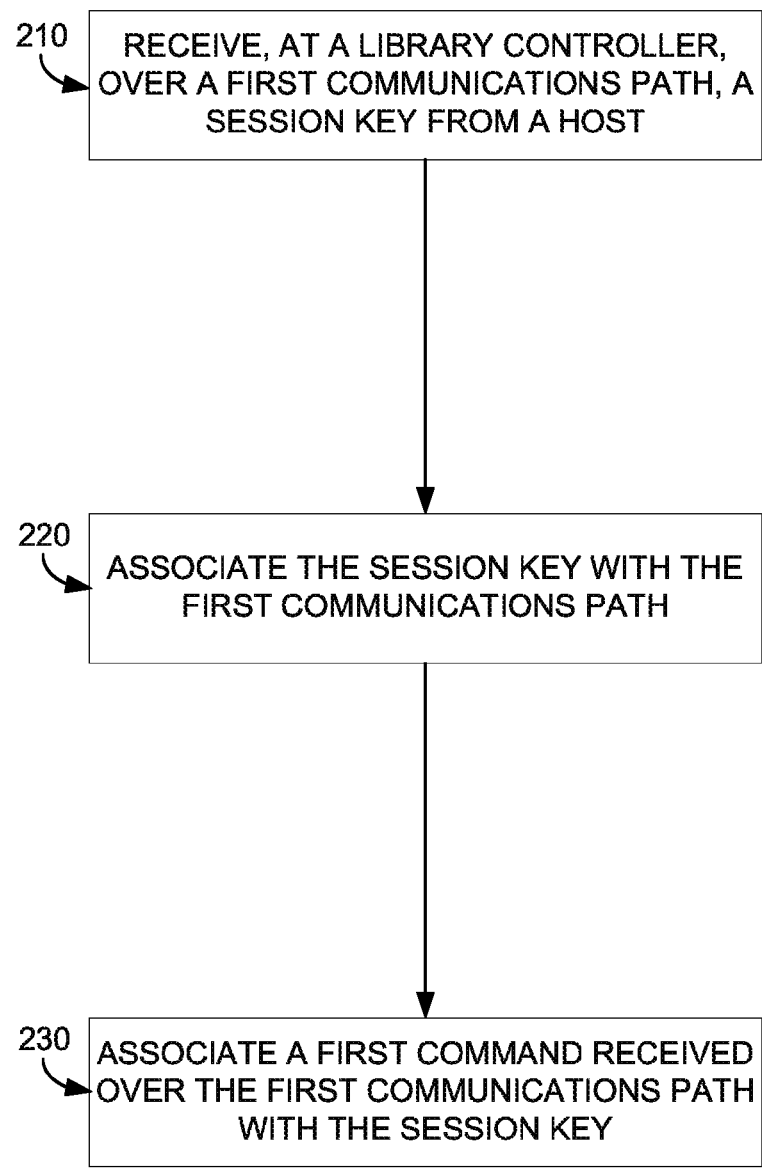
FIG. 2 is an example of a high level flow diagram for associating a session key with a communications path.

FIG. 2 is an example of a high level flow diagram for associating a session key with a communications path. In block 210, a session key may be received over a first communications path at a library controller. The session key may be unique to a host and generated by the host. In block 220, the session key may be associated with the first communications path. In other words, the session key may be associated with the communications path over which the session key was received. In block 230, a first command may be received of the first communications path and associated with the session key. It should be noted that the first command itself did not include the session key, but rather the association is based on the communications path over which the command was sent.

Figure 3A:
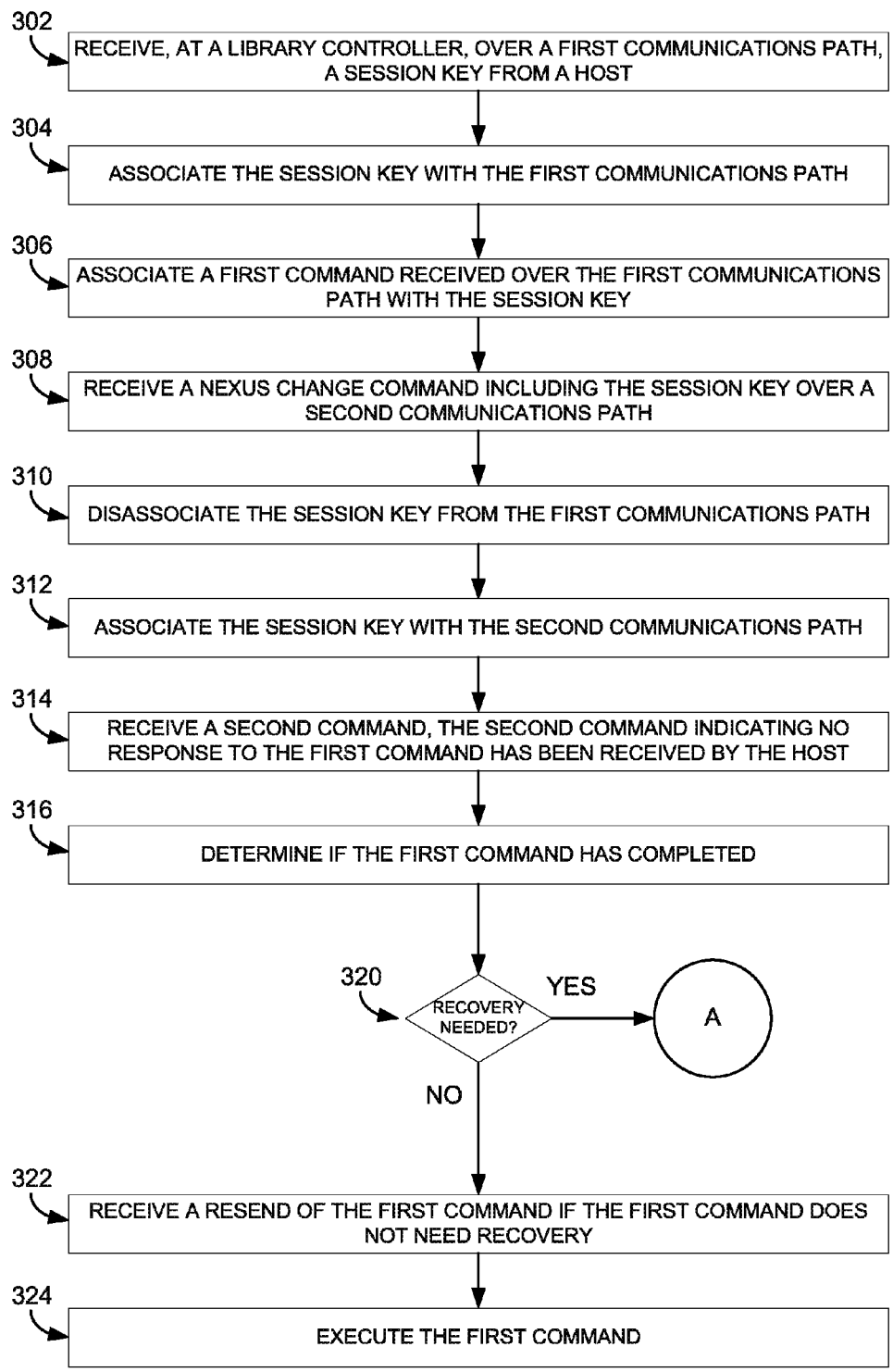
FIGS. 3(a-b) is an example of a high level flow diagram for re-associating a session key with a new communications path and recovering a command.

FIGS. 3(a-b) is an example of a high level flow diagram for re-associating a session key with a new communications path and recovering a command. In block 302 a session key may be received from a host over a first communications path at a library controller. In block 304 the session key may be associated with the first communications path. In block 306, a first command received over the first communications path may be associated with the session key. In block 308 a nexus change command including the session key may be received over a second communications path. As explained above, in some example implementations the session key may be sent during the initialization process, and is thus not included in the nexus change command.

In block 310 the session key may be disassociated with the first communications path. In block 312 the session key may be associated with the second communications path. In block 314, a second command may be received. The second command may indicate that no response to the first command has been received by the host. The second command may indicate that recovery is needed. In block 316 it may be determined if the first command has completed.

In block 320 it may be determined if recovery of the command is needed. As explained above, commands which cause persistent changes in the media library may need recovery, because the state of the media library is dependent on if the previous command has completed or not. If recovery is needed, the process moves to reference A, which is explained in further detail in FIG. 3(b). If recover is not needed, the process moves to block 322. In block 322 a resend of the first command may be received. In block 324, the first command may be executed. The results may be sent to the host over the communications path associated with the session key.

Figure 3B:
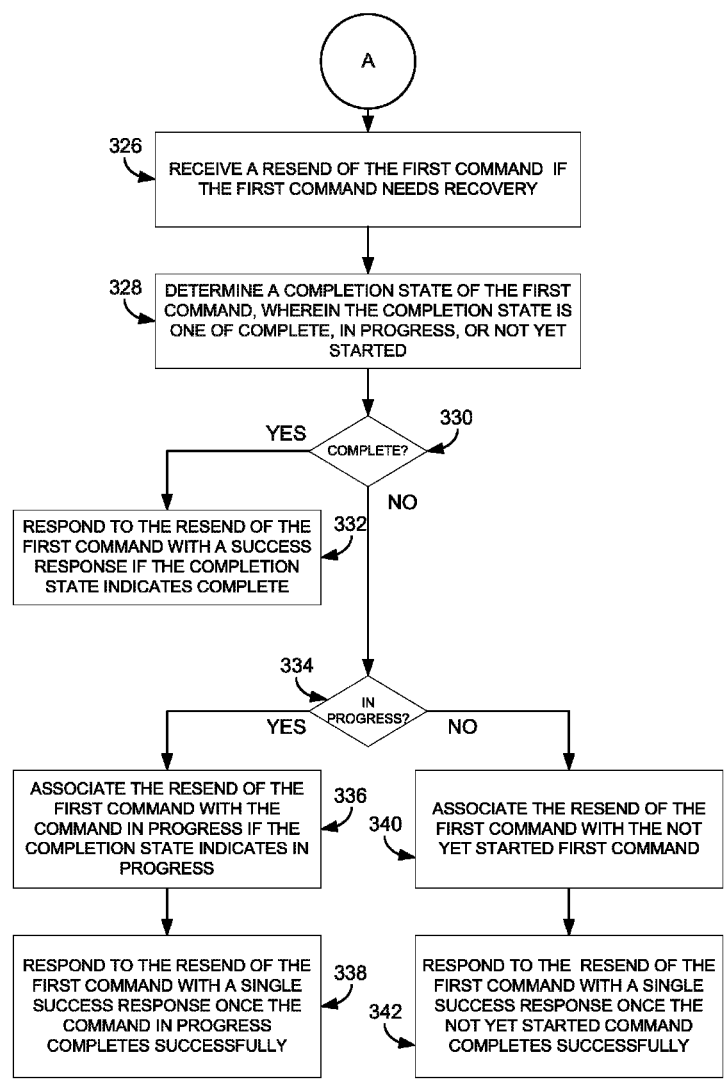

If recovery is needed, the process moves to reference A in FIG. 3(b). In block 326 a resend of the first command may be received if the first command requires recovery. In block 328, the completion status of the first command may be determined, wherein the completion status may be one of complete, in progress, or not yet started. There is a fourth state, which may be that the command was not received, but this command can be categorized with the not yet started completion state.

In block 330, it may be determined if the command has completed. If so, the process moves to block 332. In block 332 the resend of the first command may be responded to with a success response if the completion state indicates that the first command has completed successfully. Otherwise, the process moves to block 334, where it is determined if the first command is in progress. If the first command is in progress, the process moves to block 336. In block 336, the resend of the first command may be associated with the command in progress if the completion state indicates that the first command is in progress. In block 338 the resend of the first command may be responded to with a single success response once the command in progress completes successfully.

If the determination in block 334 indicates that the first command is not in progress, the first command is either in queue waiting to complete or was not received. The process then moves to block 340. In block 340, the resend of the first command is associated with the not yet started first command. In the case of the first command having never been received, the resend of the first command may be treated as a new command, and placed in the queue of commands waiting for execution. In another example implementation, the first command may be removed from the queue and the resend of the first command may be placed in the queue. In block 340, once the resend of the first command is complete, the resend of the first command may be responded to with a single success response, once the not yet started command completes successfully.

Figure 4:
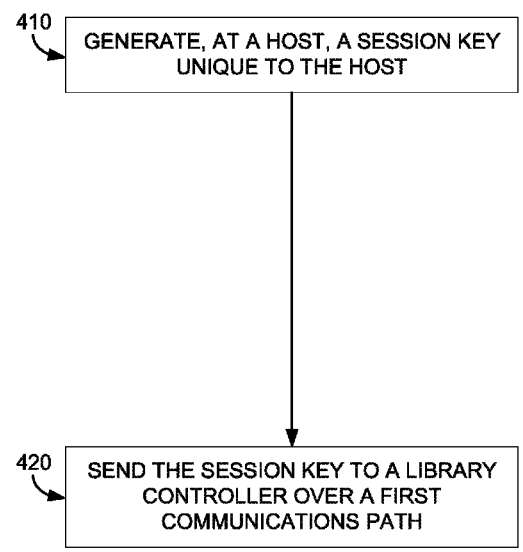
FIG. 4 is an example of a high level flow diagram for generating a session key.

FIG. 4 is an example of a high level flow diagram for generating a session key. In block 410 a host may generate a session key that is unique to the host. As explained above, the session key is associated with a host and not with any specific initiator within that host. In block 420, the session key may be sent to a library controller over a first communications path. The library controller may receive the session key and associate the session key with the communications path over which it was received. In some example implementations, the session key may be sent to the library controller over a plurality of communications paths.

Figure 5:
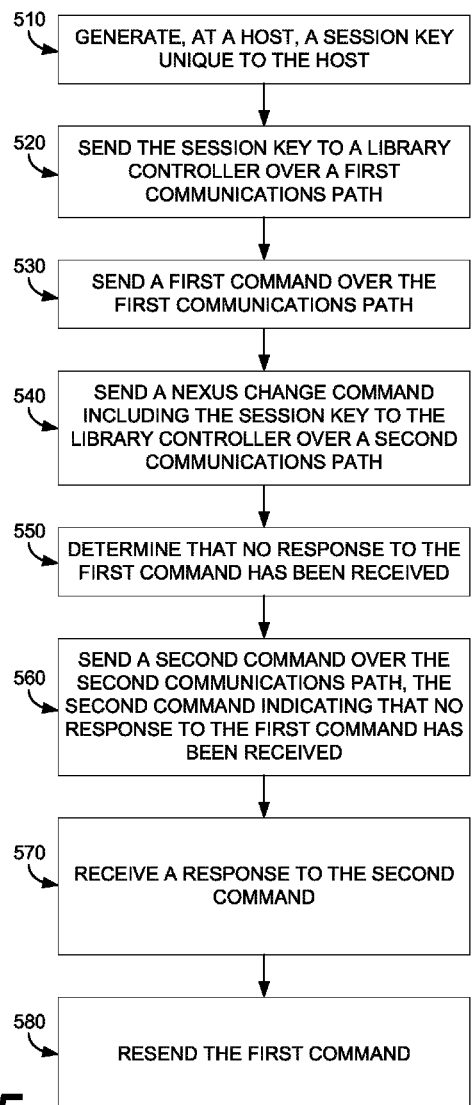
FIG. 5 is an example of a high level flow diagram for generating a session key and recovering a command.

FIG. 5 is an example of a high level flow diagram for generating a session key and recovering a command. In block 510, a session key that is unique to a host may be generated. In block 520, the session key may be sent to a library controller over a first communications path. The library controller may associate the session key with the first communications path. In block 530, a first command may be sent over the first communications path. For example, this may be a command from the host to instruct the media controller to perform some action.

In block 540, a nexus change command, which may include the session key, may be sent to the library controller over a second communications path. For example, the first communications path may have failed and the host may now communicate with the library controller over the second communications path. The library controller may now associate commands previously associated with the session key to the second communications path. In block 550, it may be determined that no response to the first command has been received. In other words, no response has been received for the first command which was sent over the first communications path.

In block 560 a second command may be sent over the second communications path. The second command may indicate that no response to the first command has been received. As mentioned above, the contents of the second command may be combined with the nexus change command. In block 570, a response to the second command may be received. In block 580, the first command may be resent. As explained above, for some commands, it is not possible to just re-execute the command, because the completion state of the command may have altered the state of the media library.

I claim:
1. A method comprising:
receiving, at a library controller, over a first communications path, a session key from a host;
associating the session key with the first communications path;

associating a first command received over the first communications path with the session key; and
sending a nexus change command over a second communications path with the session key.

2. The method of claim 1 wherein the session key uniquely identifies the host.

3. The method of claim 1 further comprising:
receiving, at the library controller, the nexus change command including the session key over the second communications path;
disassociating the session key from the first communications path; and
associating the session key with the second communications path.

4. The method of claim 1 further comprising:
receiving a second command, the second command indicating no response to the first command has been received by the host.

5. The method of claim 4 further comprising:
receiving a resend of the first command if the first command does not need recovery;
executing the first command; and
responding to the resend of the first command with a success response once the resend of the first command completes successfully.

6. The method of claim 4 further comprising:
receiving a resend of the first command if the first command needs recovery;
determining a completion state of the first command, wherein the completion state is one of complete, in progress, or not yet started.

7. The method of claim 6 further comprising:
responding to the resend of the first command with a success response if the completion state indicates complete.

8. The method of claim 6 further comprising:
associating the resend of the first command with the command in progress if the completion state indicates in progress; and
responding to the resend of the first command with a single success response once the command in progress completes successfully.

9. The method of claim 6 further comprising:
associating the resend of the first command with the not yet started first command; and
responding to the resend of the first command with a single success response once the not yet started command completes successfully.

10. The method of claim 1 comprising receiving, at the library controller, over a plurality of different paths, the session key from the host.

11. The method of claim 1 comprising receiving the nexus change command over the second communications path and retrieving the session key from a table of paths.

12. A non-transitory processor readable medium containing thereon a set of instructions which when executed by a processor cause the processor to:
generate, at a host, a session key unique to the host; and
send the session key to a library controller over a first communications path wherein the library controller associates the session key with the first communications path; and
send a nexus change command over a second communications path with the session key to the library controller.

13. The medium of claim 12, wherein the library controller disassociates the session key from the first communications path and associates the session key with the second communications path.

14. The medium of claim 13 further comprising instructions which cause the processor to:
send a first command over the first communications path;
determine that no response to the first command has been received;
send a second command over the second communications path, the second command indicating that no response to the first command has been received;
receive a response to the second command; and
resend the first command;
wherein the library controller recovers the first command based on a completion status of the first command.

15. The medium of claim 13 further comprising instructions which cause the processor to:
determine a completion state of the first command, wherein the completion state is one of complete, in process, or not yet started.

16. A device comprising:
a media library;
a media changer; and
a media library controller, the media library controller to receive a session key from a host over a first communications path, and associate the session key with the first communications path, the media library controller further to receive a nexus change command including the session key over a second communications path, and to disassociate the session key from the first communications path and associate the session key with the second communications path.

17. The device of claim 16 wherein the media controller is further to:
receive a first command over the first communications path;
receive a second command over the second communications path indicating no response to the first command was received;
receive a resend of the first command over the second communications path; and
send a single response in response to the resend of the first command.

18. The device of claim 16 wherein the nexus change command and the second command are combined into a single command.

19. The device of claim 16 comprising a table of paths to retrieve the session key.

* * * * *